Aug. 19, 1941.  L. NIESSEN  2,253,193
CHASSIS FOR VEHICLES, ESPECIALLY TUBULAR CHASSIS FOR MOTOR VEHICLES
Filed Jan. 19, 1939
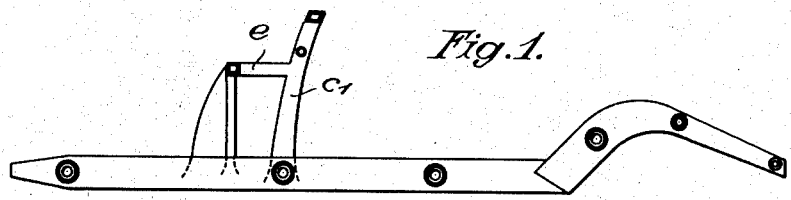
Fig. 1.
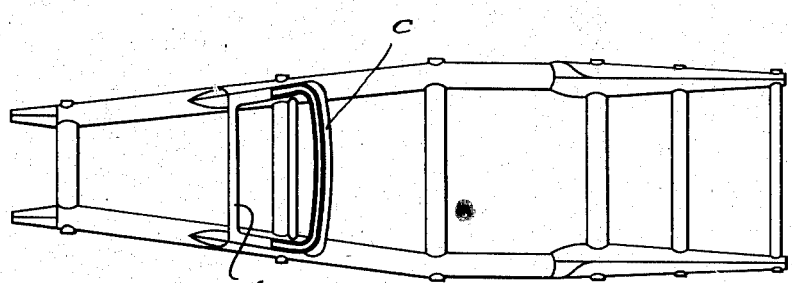
Fig. 2.
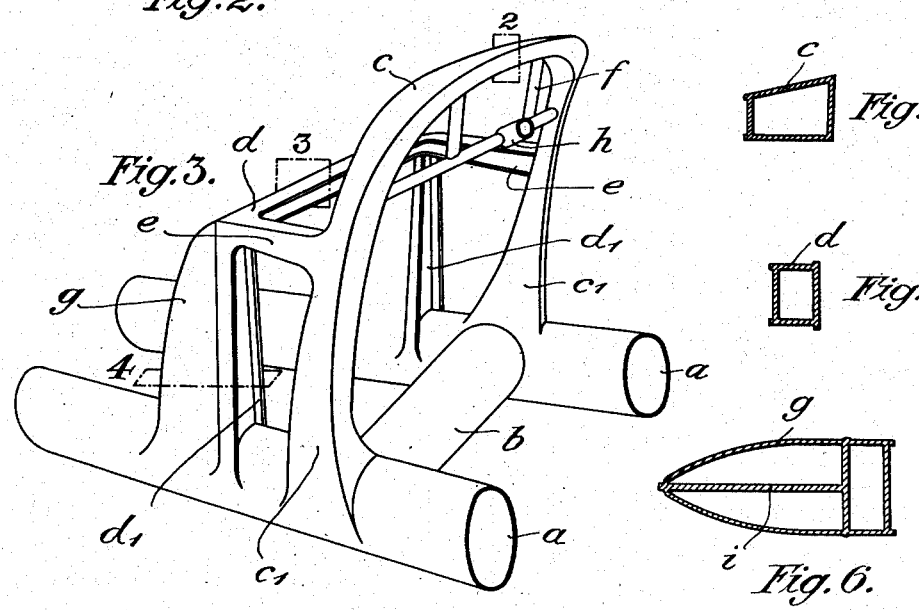
INVENTOR:
LAURENZ NIESSEN
BY Haseltine, Lake & Co.
ATTORNEYS Patented Aug. 19, 1941

2,253,193

UNITED STATES PATENT OFFICE 2,253,193

CHASSIS FOR VEHICLES, ESPECIALLY TUBULAR CHASSIS FOR MOTOR VEHICLES

Laurenz Niessen, Stuttgart-Bad Cannstatt, Germany, assignor to Daimler-Benz Aktiengesellschaft, Stuttgart-Unterturkheim, Germany Application January 19, 1939, Serial No. 251,661
In Germany April 12, 1938

14 Claims. (Cl. 296—28)

This invention relates to an improvement in vehicle chassis, especially for motor vehicle with tubular longitudinal members. The invention consists in that the so-called front portion or the frame or skeleton bordering or forming the front wall of the vehicle body is rigidly connected with the longitudinal members of the chassis so that it forms with the vehicle chassis a united rigid system, preferably a one piece system. The front wall frame reinforcing the chassis and forming a unit therewith preferably consists of two spaced inverted U-shaped hollow frame members the ends of whose arms are placed on the longitudinal chassis members and preferably connected the one with the other by stiffening stays. A particularly stiff front wall frame is produced if it is made of hollow section girders which are welded together and to the chassis frame, and when the longitudinal chassis members or girders are reinforced by one or several cross chassis members in proximity to the U-shaped hollow frame members, preferably underneath or between them. The front wall frame forms then with the longitudinal chassis members and cross members a three dimensional structure, vehicle chassis and front wall frame stiffening each other in a very efficient manner and enclose a hollow space for example of substantially rectangular shape in longitudinal and transverse direction.

Furthermore, the U-shaped frame members forming the front wall frame are preferably so constructed that they widen towards the longitudinal members and are welded thereto on a large cross-sectional area. Apart from the very great stiffening of the vehicle chassis obtained hereby, the invention effects a good protection against smashing of the vehicle body in the case of accidents and at the same time affords a wide scope as regards the artistic design of the vehicle body and engine bonnet.

An embodiment of the invention is illustrated by way of example in the accompanying drawing, in which:

Fig. 1 shows a side-view and Fig. 2 a top plan view of a chassis with the front portion according to the invention.

Fig. 3 is a rear perspective view showing a section of a tubular chassis for motor vehicles at the point at which the front portion or the front wall of the body is located.

Figs. 4, 5 and 6 are cross-sectional views taken on planes 2, 3 and 4 respectively of Fig. 3.

In the example illustrated the vehicle chassis consists of two tubular longitudinal members $a$ of oval cross-section which are connected the one with the other by a plurality of similar cross-members $b$. Two inverted U-shaped hollow frame members $c$ and $d$ are arranged in spaced relationship on these tubular members, the arm ends $c'$ and $d'$ of these straps being placed on the members $a$. The front U-shaped hollow frame member $d$ is lower than the rear bent U-shaped hollow frame member $c$. The two members are connected at the height of the web of the U-shaped hollow frame member $d$ by reinforcing stays $e$ extending in the longitudinal direction of the chassis which are arranged in the height of the lower U-shaped hollow frame member, preferably the front one, and the whole assembly, $c, d, e$ with the longitudinal tubular members $a$ and with a tubular cross-member $b$ provided at this point, form an extraordinarily rigid, box-shaped housing, which is particularly secured against transverse and longitudinal stresses by tubular stays $f$ (forming a frame-work) and by an additional wing arrangement $g$. Fittings for parts to be inserted later on, e. g. a bearing eye $h$ for the steering shaft, may be fixed on the tubular stays $f$. The U-shaped hollow frame members $c, d$, the longitudinal stays $e$ and also the additional wing arrangement $g$ are constructed as hollow stays or posts which may be internally stiffened by additional plates or stays $i$. Moreover, all parts are welded together.

As can be seen from the drawing the arm ends $c'$ and $d'$ and the wings $g$ widen towards the longitudinal chassis members $a$ so that they merge into these members with a large cross-sectional area and are welded on to the periphery of the tubular member $a$.

Having now particularly described and ascertained the nature of my said invention and in what manner the same is to be performed I declare that what I claim is:

1. Vehicle chassis of the type having tubular longitudinal girders, comprising a frame forming the front wall of the vehicle body and consisting of two U-shaped hollow section framework stays or members spaced apart, and stiffening struts interconnecting said framework members, said members at their side ends being rigidly united with said longitudinal girders so that the resulting framework thus forms a homogeneous rigid system with the chassis of the vehicle.

2. Vehicle chassis according to claim 1, wherein the stiffening struts are welded to the framework stays or members and the latter are welded to the longitudinal girders of the vehicle.

3. Vehicle chassis according to claim 1, wherein the vertical portions of said framework stays or member comprise additional stiffening wall members arranged within the hollow cross section of said framework stays or members extending substantially in vertical planes thereby subdividing said hollow cross section into at least two hollow spaces.

4. Vehicle chassis according to claim 1, wherein the stiffening struts are welded to the framework stays or members and the latter are welded to the longitudinal girders of the vehicle, and wherein cross stays are disposed upon the frame of the chassis in order to stiffen the longitudinal girders of said chassis adjacent to the U-shaped hollow section framework members, said U-shaped hollow section framework members together with the longitudinal girders defining a hollow space which is preferably of rectangular form in longitudinal and cross section.

5. Vehicle chassis according to claim 1, wherein the stiffening struts interconnecting the hollow framework members extend in general parallelism to the longitudinal girders of the chassis and are disposed substantially at the level of the lower front U-shaped hollow framework member.

6. Vehicle chassis according to claim 1, wherein the stiffening struts are welded to the framework stays or members which widen at their ends toward the longitudinal girders of the chassis and at said ends are welded to said girders with a large cross sectional area at each end.

7. Vehicle chassis according to claim 1, wherein additional stiffening means are included consisting preferably of tubes forming a lattice work and serving as a support.

8. Vehicle chassis of the type having tubular longitudinal girders, comprising a frame forming the front wall of the vehicle body and consisting of two U-shaped hollow section framework stays or members spaced apart and open at the bottom and stiffening struts interconnecting said framework members, said members at their side ends being rigidly united with said longitudinal girders so that the resulting framework thus forms a homogeneous rigid system.

9. Vehicle chassis for motor vehicles with tubular longitudinal chassis members, comprising a front portion or a frame bordering the front wall of the vehicle body rigidly connected with the longitudinal chassis members so that it forms with the vehicle chassis a rigid system, the front wall frame consisting of U-shaped hollow section-girders, the longitudinal chassis members being stiffened near the U-shaped hollow girders between them by at least one cross-chassis member in such a manner that the two U-shaped hollow girders forming the front wall frame together with the longitudinal members enclose a hollow space which is substantially rectangular in longitudinal and cross-section.

10. Vehicle chassis comprising longitudinal chassis girders, two U-shaped hollow framework members spaced apart and arranged substantially in vertical transverse planes of the vehicle, the vertical portions of said members having the cross-sectional areas thereof increasing gradually downwardly toward said longitudinal girders and said vertical portions of said members being rigidly united with the latter at the maximum cross-sections of said members.

11. Vehicle chassis according to claim 10, in combination with stiffening members extending substantially in a longitudinal direction of the vehicle and rigidly connecting the hollow framework members additionally to the longitudinal girders.

12. Vehicle chassis according to claim 10, in combination with stiffening members extending substantially in a longitudinal direction of the vehicle and rigidly connecting the hollow framework members additionally to the longitudinal girders, and at least one cross member rigidly connecting said longitudinal girders adjacent to said framework members.

13. Vehicle chassis comprising two tubular longitudinal girders, a hollow U-shaped cross member with the bend at the top and the interior open toward the bottom, arranged in a plane substantially vertical to the vehicle, vertical stays supporting and forming part of said cross member, said stays widening downwards so as to present a large cross section joined to the tubular longitudinal girders in such manner as to partly embrace the tubular longitudinal girders at their point of junction and be directly welded to them.

14. Vehicle chassis as in claim 13, having an additional hollow cross member bent in the shape of a U, which at a certain distance from the first U-shaped hollow cross member is arranged in a manner corresponding to the latter and designed in a manner corresponding to the latter, and stiffening members connecting said two U-shaped cross members in such manner that the longitudinal frame girders, said U-shaped cross members and said stiffening members form a rigid frame assembly.

LAURENZ NIESSEN.